Patented Aug. 10, 1926.

1,595,178

UNITED STATES PATENT OFFICE.

WALTER DUISBERG, WINFRIED HENTRICH, AND LUDWIG ZEH, OF WIESDORF-ON-THE-RHINE GERMANY, ASSIGNORS TO GRASSELLI DYESTUFF CORPORATION, OF NEW YORK, N. Y.

MONO AZO DYES.

No Drawing. Application filed November 26, 1924, Serial No. 752,458, and in Germany December 5, 1923.

We have found new and useful improvements in mono azo dyes.

This invention relates to the production of new mono azo dyes which are particularly valuable for dyeing organic cellulose esters and cellulose ethers such as cellulose acetate, cellulose formate, ethyl-cellulose, methyl-cellulose, cellulose actetate fibres, cellulose acetate films, etc. Cellulose esters and cellulose ethers dyed with our new dyes also form part of our invention.

Whereas most of the known mono azo dyes have no affinity for such cellulose esters or cellulose ethers, which for the purpose of this invention will be referred to herein as organo-oxy-cellulose compounds, we have found that the products obtained by combining diazotized dinitro-aniline-sulfo or carboxylic acids with aromatic amines having no sulfo groups in the molecule, or similar amines substituted in the amino group, dye readily such organo-oxy-cellulose compounds, shades ranging from orange-red to violet and blue being obtained. As first component we can use products such as 2.6-dinitroaniline-4-sulfonic acid, 2.4-dinitroaniline-6-sulfonic acid, 2.4-dinitroaniline-6-carboxylic acid, etc. As coupling compound we use aniline, toluidine, xylidine, alpha-naphthylamine, beta-naphthylamine, monomethylaniline, di-methylaniline, methyl-aplha-naphthylamine, ethyl-alpha-naphthylamine, ethyl-beta-naphthylamine, etc.

In order to illustrate further our invention, the following examples are given, the parts being by weight, but it is understood that the invention is not limited thereto:

Example 1.—280 parts of 2.6-dinitroaniline-4-sulfonate of ammonium are diazotized and coupled in mineral acid solution with 143 parts beta-naphthylamine. The dyestuff is isolated in the usual way; it dyes cellulose acetate silk deep red shades. It is in form of its sodium salt a dark brownish powder soluble in water with a reddish color and yielding by reduction with zinc and hydrochloric acid 1.2.6-triaminobenzene-4-sulfonic acid and amino-beta-naphthylamine.

The dyestuff has in the form of its ammonium salt most probably the formula:

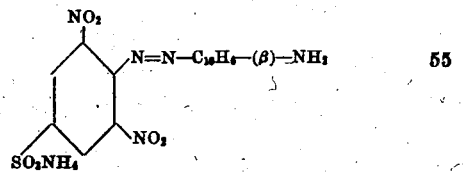

Example 2.—280 parts of 2.6-dinitroaniline-4-sulfonate of ammonium are diazotized and coupled in mineral acid solution with 143 parts of alpha-naphthylamine. The dyestuff is isolated in the usual way; it dyes cellulose acetate bordeaux shades. It is in form of its sodium salt a dark brownish powder soluble in water with a bluish-red color and yielding by reduction with zinc and hydrochloric acid 1.2.6-triaminobenzene-4-sulfonic acid and amino-alpha-naphthylamine.

The dyestuff in the form of its ammonium salt has most probably the formula:

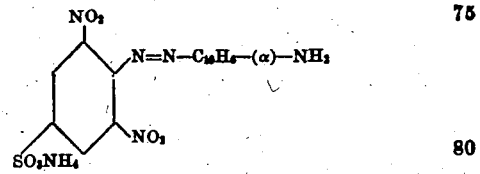

Example 3.—280 parts of 2.6-dinitroaniline-4-sulfonate of ammonium are diazotized and coupled in mineral acid solution with 171 parts of ethyl-alpha-naphthylamine. The dyestuff is isolated in the usual way. Violet shades are obtained when cellulose acetate fibres are dyed with this product. It is in form of its sodium salt a dark powder soluble in water with a violet-blue color and yielding by reduction with zinc and hydrochloric acid 1.2.6-triaminobenzene-4-sulfonic acid and amino-ethyl-alpha-naphthylamine.

The dyestuff in the form of its ammonium salt has probably the formula:

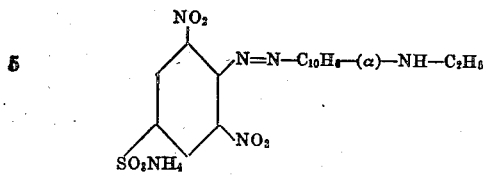

Example 4.—301 parts of 2.4-dinitroaniline-6-sulfonate of potassium are diazotized in mineral acid solution and coupled with 171 parts of ethyl-beta-naphthylamine. The dyestuff is isolated in the usual way; it dyes blue shades on cellulose acetate. It is in form of its sodium salt a dark powder of a metallic lustre soluble in water with a bright blue color and yielding by reduction with zinc and hydrochloric acid 1.2.4 triamino-benzene-6-sulfonic acid and amino-ethyl-beta-naphthylamine.

The dyestuff in the form of its potassium salt has probably the formula:

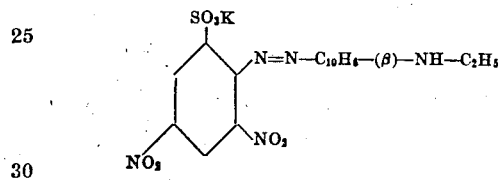

Example 5.—244 parts of 2.4-dinitroaniline-6-carboxylate of ammonium are diazotized and coupled in mineral acid solution with 171 parts of ethyl-beta-naphthylamine. The dyestuff is isolated in the usual way; it dyes cellulose acetate silk in bluish violet shades. It is in form of its sodium salt a dark powder soluble in water with a bluish-violet color and yielding by reduction with zinc and hydrochloric acid 1.2.4 triamino-6-benzoic acid and amino-beta-naphthylamine.

The dyestuff in the form of its ammonium salt has probably the formula:

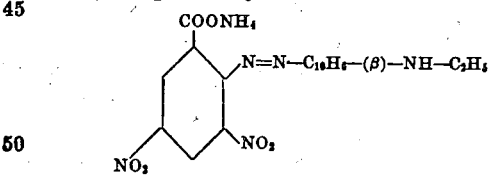

We claim:—

1. The process comprising diazotizing acid substituted dinitroanilines and coupling the diazo compounds obtained with aromatic amines having no acid group in the molecule.

2. The process comprising diazotizing dinitroaniline-sulfonic acids and coupling the diazo-compounds obtained with aromatic amines having no acid group in the molecule.

3. The process comprising diazotizing dinitroaniline-sulfonic acids and coupling the diazo compounds obtained with naphthylamines having no acid group in the molecule.

4. The process comprising diazotizing dinitroaniline-sulfonic acids and coupling the diazo compounds obtained with naphthylamines having no metal salt-forming group in the molecule.

5. The process comprising diazotizing dinitroaniline-sulfonic acids and coupling the diazo compounds obtained with ethyl-beta-naphthylamine.

6. As new products the mono azo dyestuffs which can be obtained by coupling diazotized acid substituted dinitroanilines with aromatic amines having no acid group in the molecules which dyestuffs are reddish to dark brown powders soluble in water with from orange to blue color, dyeing organo-oxy-cellulose compounds from red to violet and blue shades and which by reduction with zinc and hydrochloric acid yield an acid substituted triaminobenzene and an aromatic diamine.

7. As new products the mono azo dyestuffs which can be obtained by coupling diazotized acid substituted dinitroanilines with naphthylamines having no acid group in the molecule, which dyestuffs are red to dark brown powders soluble in water from red to violet to blue shades, dyeing organo-oxy-cellulose compounds from red to blue shades and which by reduction with zinc and hydrochloric acid yield an acid substituted triaminobenzene and a naphthylene-diamine.

8. As a new product the mono azo dyestuff which can be obtained by coupling 1-diazo-2.6-dinitrobenzene-4-sulfonate of ammonium with ethyl-alpha-naphthylamine, which dyestuff is a dark brownish powder soluble in water with a violet-blue color, dyeing cellulose acetate violet shades and yielding by reduction with zinc and hydrochloric acid 1.2.6-triaminobenzene-4-sulfonic acid and amino-ethyl-alpha-naphthylamine.

9. As a new product, an organo-oxy-cellulose compound material dyed with the dyestuffs of claim 6.

10. As a new product, an organo-oxy-cellulose compound material dyed with the dyestuffs of claim 7.

11. As a new product, an organo-oxy-cellulose compound material dyed with the dyestuff of claim 8.

In testimony whereof we have hereunto set our hands.

WALTER DUISBERG.
WINFRIED HENTRICH.
LUDWIG ZEH.